UNITED STATES PATENT OFFICE.

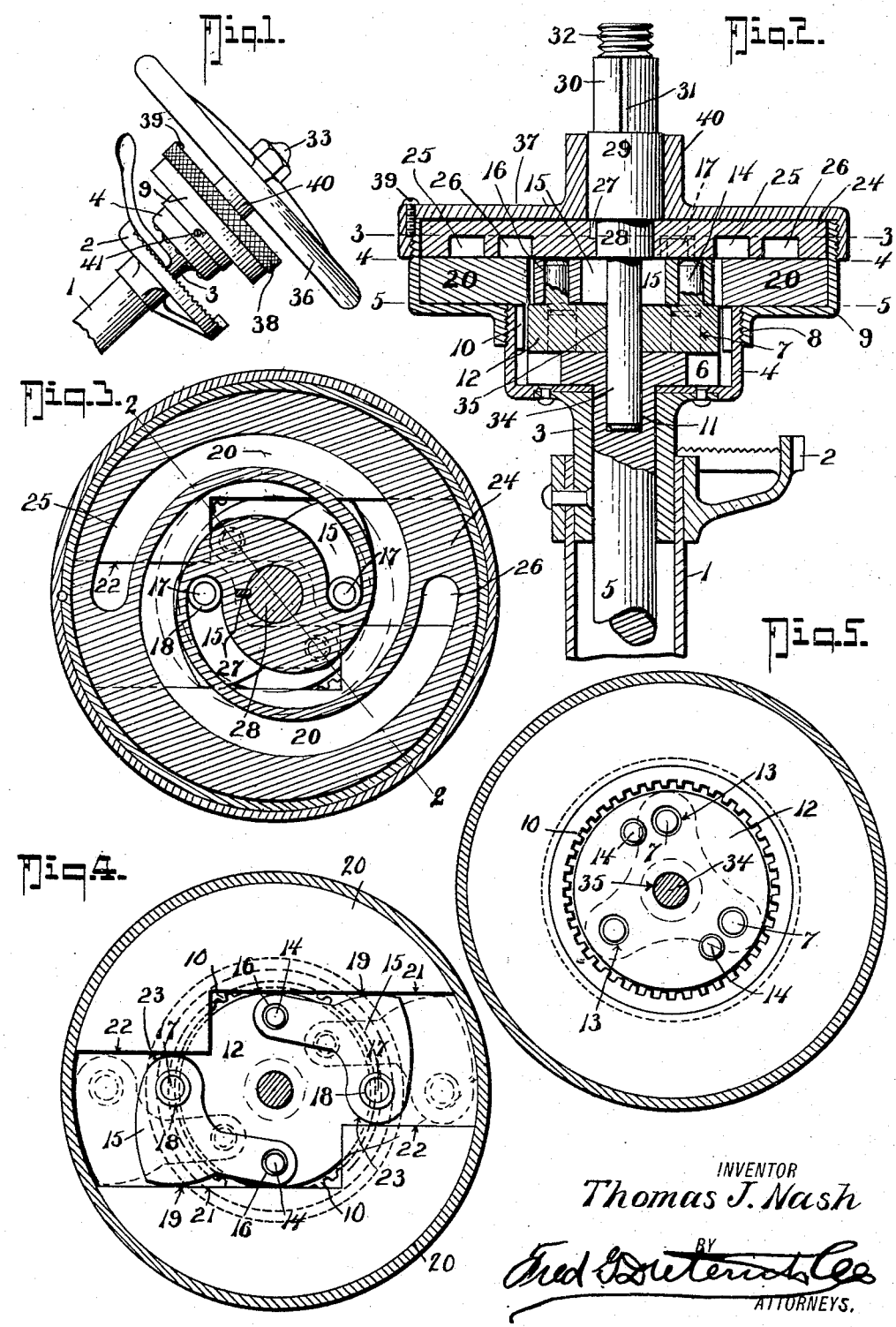

THOMAS J. NASH, OF LINCOLN, NEBRASKA, ASSIGNOR TO NASH MANUFACTURING COMPANY.

STEERING MECHANISM.

1,203,244.  Specification of Letters Patent.  Patented Oct. 31, 1916.

Application filed November 8, 1915. Serial No. 59,793.

*To all whom it may concern:*

Be it known that I, THOMAS J. NASH, residing at Lincoln, in the county of Lancaster and State of Nebraska, have invented certain new and useful Improvements in Steering Mechanism, of which the following is a specification.

This invention relates to certain new and useful improvements in steering mechanism which have been especially designed for use on Ford cars as a substitute for the present planetary gearing located directly under the steering wheel, the planetary gearing being the present steering equipment furnished with the Ford machines.

It is a well-known fact that the planetary gearing now employed on Ford machines is not a positive steering apparatus, but requires constant effort on the part of the driver to keep the car in the required course, as motion and road shocks are easily transmitted from the front wheels of the car to the steering wheel, through the planetary gearing.

An object of my invention is to provide a device that can be quickly placed on the Ford car by removing the cover of the gear box and also the planetary gears and installing the additional parts necessary in order to provide my present invention.

A further object of the invention is to provide a mechanism which is positive in its action, which gives the same results as a worm gear and which is strong, simple, powerful, easily operated, and easily and quickly installed without the necessity of any change in the permanent structural parts of the present Ford steering gear.

Generically the present invention comprises an auxiliary gear case member designed to be screwed onto the gear case of the present construction in lieu of the gear case cover and in which is included a double cam mechanism coöperating with levers that are pin-connected with the spindles on the gear post spider which, in the present construction, carries the planetary gears.

The invention also includes those novel details of construction, combination and arrangement of parts, all of which will be first fully described, then be specifically pointed out in the appended claims, reference being had to the accompanying drawing, in which:—

Figure 1 is a side elevation of the upper end of a steering post of the Ford type with my invention applied. Fig. 2 is a vertical section on the line 2—2 of Fig. 3. Fig. 3 is a horizontal section on the line 3—3 of Fig. 2. Fig. 4 is a horizontal section on the line 4—4 of Fig. 2, the levers being shown in the position they assume when the cam has been turned about one-third of a revolution. Fig. 5 is a horizontal section on the line 5—5 of Fig. 2.

In the drawing in which like numerals of reference indicate like parts in all of the figures, 1 is the steering post tube to which the spark and throttle lever racks 2 and the gear case shank 3 are secured at the upper end. The gear case shank 3 is permanently secured to the gear box 4, which gear box 4 is provided with an internal rack 10 (with which the planetary gears in the present Ford construction mesh).

5 designates the steering post, the upper end of which is formed with a spider 6 that carries three pins 7 on which, in the present Ford construction, the planetary gears (not shown) are journaled. The steering post is provided with the recess 11 in which the bearing end of the steering wheel stub shaft spindle (in the present Ford construction) is designed to seat.

All of the foregoing described parts are of the ordinary or present construction and in order to apply my invention, the gear case cover is unscrewed from the gear case 4 and the steering wheel spindle is removed from the steering wheel. The parts constituting my invention are substituted for the parts removed.

The gear case 4, as shown, is externally threaded and the supplemental gear case 9 which constitutes a part of my invention has a threaded flange 8 to screw onto the gear case 4 in lieu of the cover part removed.

12 designates a disk having three holes 13 to fit over the pins 7 on the spider 6 and the disk 12 itself is provided with a pair of diametrically opposite pins 14 which form the bearing fulcrums for the levers 15 to connect the levers 15 to the steering post 5, the said levers 15 having apertures 16 to receive the pin 14.

17 designates pins on the levers 15 which carry rollers 18 to ride in the cam grooves 25—26 of the cam disk 24, there being one cam groove provided for each lever 15.

The levers 15 have rounded surfaces 19 to engage with the walls 21 of the blocks 20 and also rounded ends to engage with the walls 22 of the blocks 20, the blocks 20 being suitably secured in the auxiliary gear case 9 against movement in any desired fashion.

The disk 24 is keyed or otherwise suitably secured at 27 to the hub 28 of the steering wheel stub shaft 29, the latter having bearing in the sleeve 40 of the cover 37. The stub shaft 29 has a portion 30 to receive the steering hub and a key slot 31 for the usual keys. The end 32 of the stub shaft is designed to receive the present nut 33 that secures the steering wheel to the stub shaft, and the stub shaft is also provided with the spindle end 34 that projects through the central hole 35 of the disk 12 and has bearing in recess 11 of the steering post 5.

The cap or the cover 37 is screwed onto the auxiliary housing 9 and is secured in the usual way by a set screw 39, while the housing 9 is secured from rotation on the housing 4 by a suitable set screw 41 or otherwise. The cover 37 may have its edge milled, as at 38, if found desirable.

In practice, with my invention employed in lieu of the present planetary steering mechanism, as the steering wheel 36 is turned in a clockwise direction, the levers 15 are moved from the position shown in Fig. 3 to the position shown in Fig. 4 (the dotted position of the levers being the limit of movement) to turn the car in a right handed direction, it being, of course, understood that when the car is running straight, the levers 15 will be say between the position shown in Fig. 3 and the position shown in dotted lines (shown in Fig. 4) so as to enable the car to be turned in either direction correspondingly as the steering wheel is turned in a clockwise direction or a counter-clockwise direction.

By reason of the cam and lever arrangement any road shocks imparted to the wheels will not effect a turning of the post 5 since that post will be locked against turning. Thus the running wheels of the machine will remain in any position to which they have been turned making it possible to set the front wheels of the machine to run the machine in a continuous circle without the operator holding the steering wheel as at present is necessary.

From the foregoing description taken in connection with the accompanying drawing, it is thought the complete construction, operation and advantages of my invention will be readily understood by those skilled in the art.

What I claim is:

1. In a steering mechanism, the combination with a steering post, a fixed gear case, a pin carrying plate coupled to turn with the steering post, levers having bearings on the pins of said plate, a disk having camways, members on said levers to project into engagement with said camways, a steering wheel stub shaft connected to said cam disk to turn the same, and a cover for said gear case.

2. In a steering mechanism, the combination with a steering post, a fixed gear case, a pin carrying plate coupled to turn with the steering post, levers having bearings on the pins of said plate, a disk having camways, members on said levers to project into engagement with said camways, a steering wheel stub shaft connected to said cam disk to turn the same, a cover for said gear case, and transverse guideways within said case for said levers.

3. In a steering gear, the combination with the steering post having a pin carrying spider at its upper end and a primary gear case embracing said spider, a pin carrying plate apertured to fit over the pins of said spider in said gear case, an auxiliary gear case and a cover therefor fitted over said primary gear case, spaced blocks forming transverse guideways within said auxiliary gear case, a cam disk in said auxiliary gear case, levers in said auxiliary gear case to move in said transverse guideways, said levers having pin holes to receive the pins of said pin carrying plate and having members to project into said cam disk, and a steering wheel stub shaft coupled to said disk.

4. In a steering gear, the combination with the steering post having a pin carrying spider at its upper end and a primary gear case embracing said spider, a pin carrying plate apertured to fit over the pins of said spider in said gear case, an auxiliary gear case and a cover therefor fitted over said primary gear case, spaced blocks forming transverse guideways within said auxiliary gear case, a cam disk in said auxiliary gear case, levers in said auxiliary gear case to move in said transverse guideways, said levers having pin holes to receive the pins of said pin carrying plate and having members to project into said cam disk, a steering wheel stub shaft coupled to said disk, and having bearing in the said cover and in the said steering post.

5. As a new article of manufacture, the following sub-combination of elements comprising an auxiliary gear case having an internally threaded flange at its bottom and externally threaded near its upper edge, a gear case cover for the upper end of said auxiliary gear case, said cover having a bearing, a steering wheel stub shaft journaled in said bearing, spaced blocks forming transverse guideways in said auxiliary gear case, a cam disk fitted over said blocks, a lever having a member projecting into the camway of said disk and having a pin hole, a pin carrying plate whose pin projects into said pin hole, said plate being located beneath said guideway blocks and itself having pin holes, substantially as shown and for the purpose described.

6. In a steering mechanism, the combination with the steering post, the relatively fixed primary gear case and the steering post pin carrying spider, of an auxiliary gear case and its cover mounted on said primary gear case, a pin carrying plate, itself having a pin hole to fit onto the pin of said spider, the pin of said pin carrying plate projecting into said auxiliary gear case, means forming a transverse guideway in said auxiliary case, a lever mounted in said transverse guideway and having a bearing fitted onto the pin of said pin carrying plate, a disk having a camway mounted in said auxiliary gear case, a member on said lever projecting into said camway, a steering wheel stub shaft having bearing in said gear case cover and coupled with said cam disk to turn the same.

7. In a steering mechanism, the combination with the steering post, the relatively fixed primary gear case and the steering post pin carrying spider, of an auxiliary gear case and its cover mounted on said primary gear case, a pin carrying plate, itself having a pin hole to fit onto the pin of said spider, the pin of said pin carrying plate projecting into said auxiliary gear case, means forming a transverse guideway in said auxiliary casing, a lever mounted in said transverse guideway and having a bearing fitted onto the pin of said pin carrying plate, a disk having a camway mounted in said auxiliary gear case, a member on said lever projecting into said camway, a steering wheel stub shaft having bearings in said gear case cover and coupled with said cam disk to turn the same, said pin carrying plate and said steering post having bearing apertures and said steering wheel stub shaft having a spindle portion to project into said bearing apertures.

8. In a steering mechanism, the combination with the steering post and the relatively fixed gear case into which the upper end of the steering post projects, said steering post having a crank pin, a steering wheel stub shaft projected into said gear case, a cam connected to turn with said steering wheel stub shaft, and a connection between said pin carrying case and said cam whereby the action of the cam will effect a turning of the steering post, substantially as shown and described.

THOMAS J. NASH.

Copies of this patent may be obtained for five cents each, by addressing the "Commissioner of Patents, Washington, D. C."